Aug. 21, 1962    J. P. FAY    3,050,076
BREATHABLE GAS REGULATOR APPARATUS
Filed Dec. 29, 1960    3 Sheets-Sheet 3
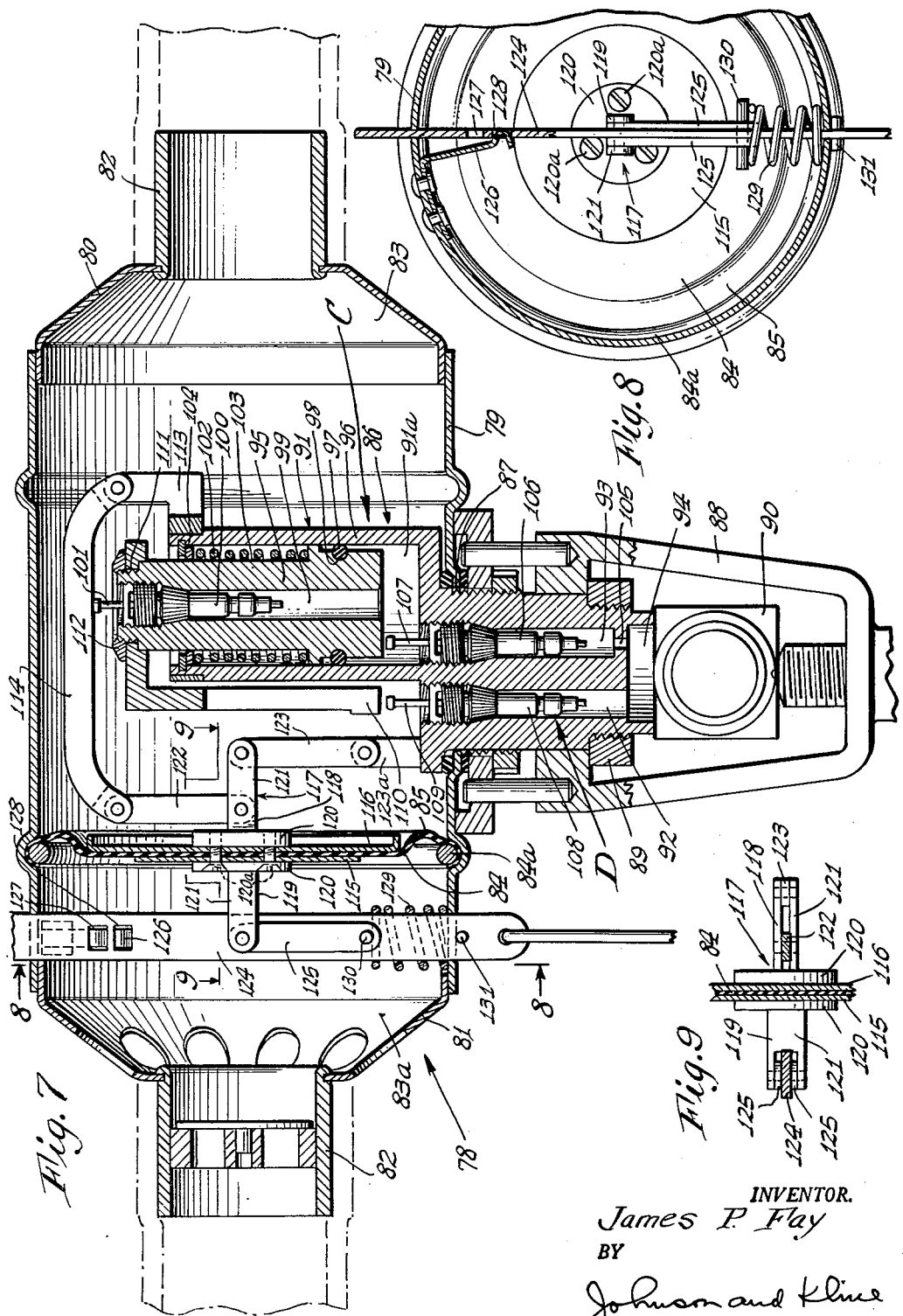
INVENTOR.
James P. Fay
BY
Johnson and Kline
ATTORNEYS United States Patent Office 3,050,076
Patented Aug. 21, 1962

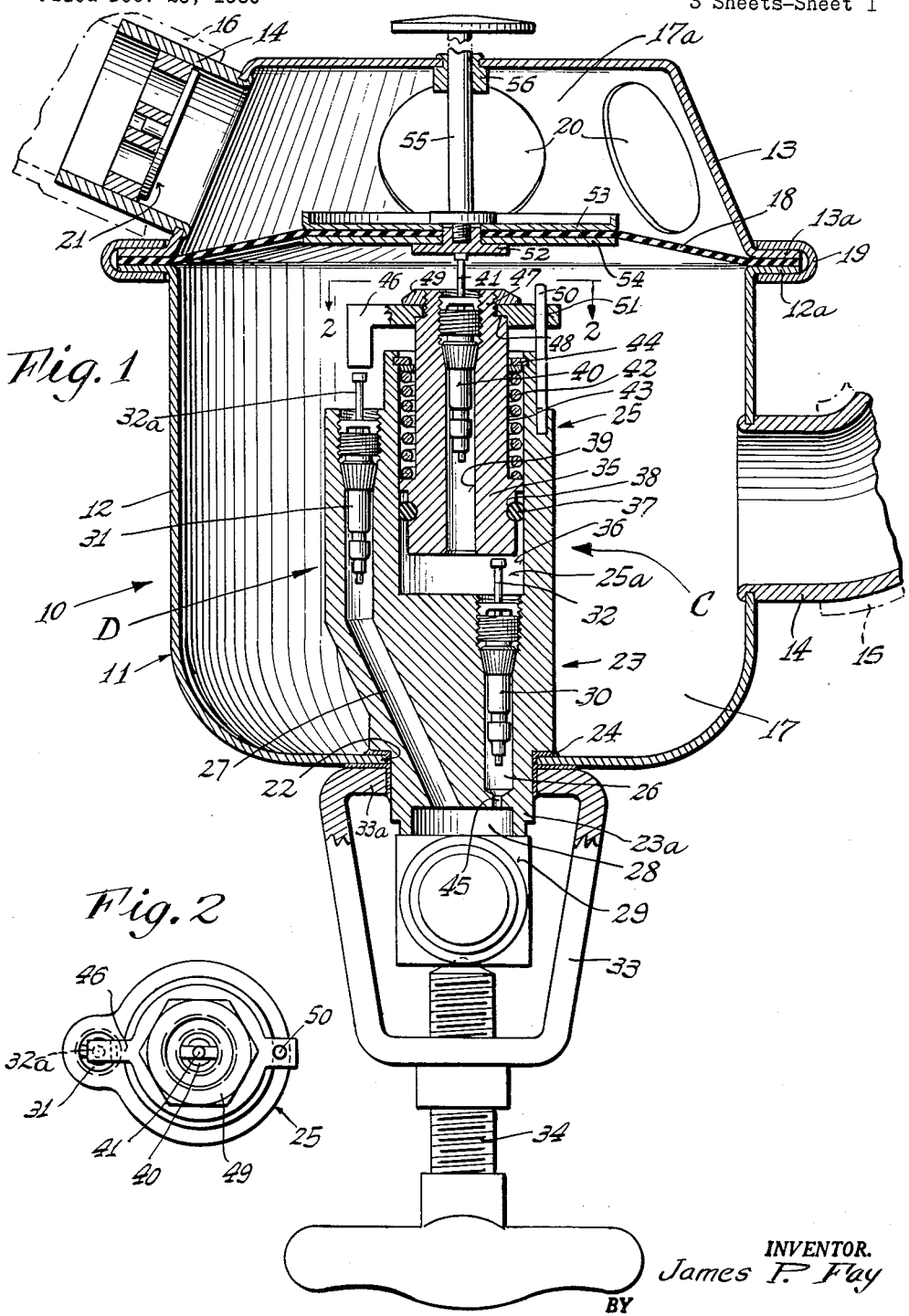

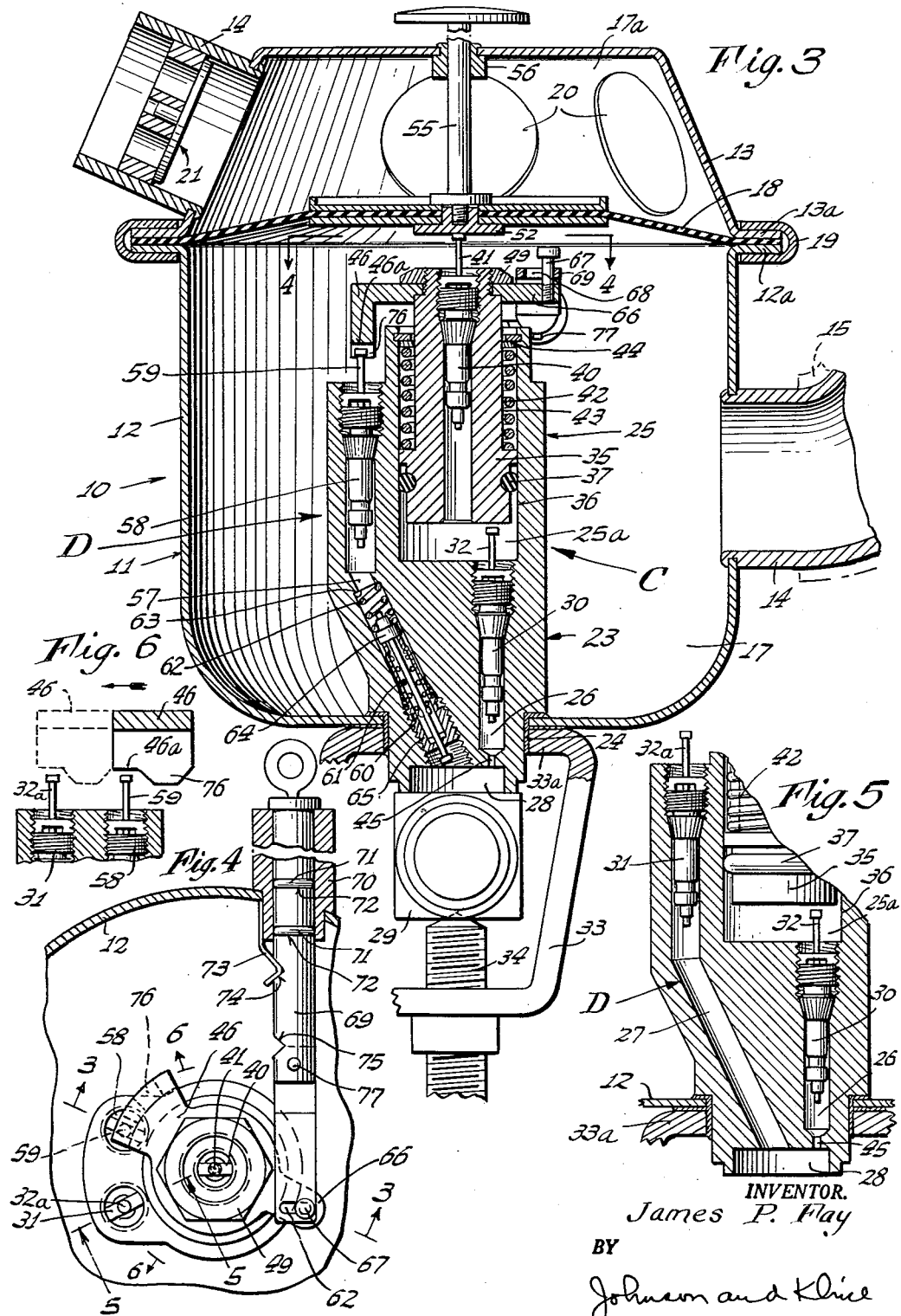

3,050,076
BREATHABLE GAS REGULATOR APPARATUS
James P. Fay, 18 France St., Norwalk, Conn.
Filed Dec. 29, 1960, Ser. No. 79,214
21 Claims. (Cl. 137—63)

This invention relates to a regulator for breathable gases. More specifically, it pertains to a demand regulator of the type commonly used in aviators breathing apparatus, self-contained underwater breathing apparatus, firemen's resuscitation equipment and similar devices.

Prior to the present invention, the demand regulator, of which I have knowledge, were design compromises, which required either more breathing effort than is desirable or provided smaller quantities of breathable gas on demand than is required.

The problems inherent in the prior regulators and the conflict in design approach are the result of the nature of gas flow through an orifice. Large area orifices, which have a high pressure differential across the orifice, provide sufficient breathable gas for demand requirements, however, the high pressure and the large area of the orifice combine to necessitate the exertion of substantial effort in opening the seal controlling the orifice. The usual solution to this problem is to resort to lever mechanisms and the like to most effectively utilize the relatively small forces available as the result of breathing effort. The alternate approach to the problem has been to reduce the size of the orifice, thus decreasing the available supply of breathable gas on demand, as aforenoted.

It is widely accepted that a breathing effort requiring pressure greater than about two inches of water is rapidly fatiguing under diving and similar conditions. It is also widely accepted that, under violent physical effort such as would be encountered in diving or the like, a person may require air flow at the rate of 30 to 40 cu. ft./min. for short periods.

It is an object of my invention to overcome the problems encountered in prior demand regulator apparatus and provide a regulator which makes available on demand a large quantity of breathable gas with a minimal exertion of effort.

According to the invention, my regulator embodies a high pressure valve offering high flow rates, which will discharge large controlled volumes of air where it will be available on demand for breathing such quantities of air as may be required, and a very low pressure chamber adapted to operate the high pressure valve in response to change of pressure in the low pressure chamber. The low pressure chamber is connected to the source of breathable gas under pressure through a small orifice having a seal, which can be opened by the exertion of very minute force, thus satisfying the "easy breathing" requirement.

To put it another way, my regulator embodies a pneumatic amplifier in which a small energy input, i.e. the breathing effort, produces a volume of breathable gas sufficient to supply quite large demand rates.

It is another object of my invention to provide means in the system of the present invention for saving a reserve supply of air for demand use after there has been a signal that the pressure at the source has dropped below a predetermined value.

According to one form of the invention, this is accomplished by providing an alternate pathway for the high pressure gas, the alternate path having access to direct communication with the source and the normal path having a 300 p.s.i. reducing valve interposed between it and the source.

A further object of my invention is to provide flush means for manually opening the valves for flushing the inhalation chamber of the regulator and hose, when necessary.

Occasionally in diving, a diver finds water in his hoses, which on being inhaled along with the air can cause panic, particularly in inexperienced divers. The manual flush eliminates this problem and avoids the cause of panic by permitting tank pressure to blow the regulator and hoses free of water.

Other objects and advantages will be apparent from the specification and claims when considered in connection with the attached sheets of drawings, illustrating one form of the invention, wherein like characters represent like parts, and in which:

FIGURE 1 is a longitudinal sectional view of a regulator embodying the invention;

FIG. 2 is a view taken in the direction of the arrows 2—2 in FIG. 1;

FIG. 3 is a longitudinal sectional view of a modification of the regulator of FIG. 1;

FIG. 4 is a fragmentary view, partially in section, taken in the direction of the arrows 4—4 in FIG. 3;

FIG. 5 is a fragmentary sectional view taken in the direction of the arrows 5—5 in FIG. 4;

FIG. 6 is a fragmentary sectional view taken in the direction of the arrows 6—6 in FIG. 4;

FIG. 7 is a longitudinal sectional view of another form of regulator embodying the invention;

FIG. 8 is a fragmentary cross-sectional view taken in the direction of the arrows 8—8 in FIG. 7; and FIG. 9 is a fragmentary view, partially in section, taken in the direction of the arrows 9—9 in FIG. 7.

The present invention provides for supplying the inhalation chamber of the regulator with large quantities of breathable gas from a supply means and control means therefor which is operated in response to very small breathing effort. This is accomplished by having a direct supply means D having valve means provided with a large orifice directly connecting the inhalation chamber to a high pressure supply of breathable gas and by controlling the supply means D with a control means or pneumatic amplifier C which acts as a servoactuator for the supply means D and is actuated by means requiring very little breathing effort to operate the same.

Referring now to the drawings, and FIGS. 1 and 2 in particular, a breathable gas regulator apparatus 10 is shown embodying the invention. The regulator comprises a housing 11, including a generally cup-shaped member 12 and a bell 13 closing the open end thereof. The housing has secured thereto hose connectors 14 which, as is well known in the art, are adapted to be connected to the inhalation or breather hose 15 and the exhalation or exhaust hose 16, which extend to the usual mouthpiece (not shown). The housing 11 is divided into an inhalation chamber 17 and an exhalation chamber 17a by means of a flexible diaphragm 18, extending across the housing, and suitably secured thereto between complementary flanges 12a and 13a of the cup-shaped member 12 and the bell 13 respectively. Means in the form of an annular clamp 19, having a U-shaped cross-section, are provided for sealingly locking the flanges 12a and 13a together on the periphery of diaphragm 18.

The exhalation chamber 17a is provided with apertures 20 opening to the water or surrounding fluid medium so that the diaphragm has impressed thereon the pressure of the medium. The usual flap type valve 21 is mounted in the hose connector 14 for the exhaust hose 16 to permit exhaled air to pass into the exhalation chamber 17a to be exhausted through the apertures 20 while at the same time preventing the flow of water from the chamber into the hose 16.

One side of the cup-shaped member 12, which in the illustrated form of the invention forms the inhalation chamber 17, is provided with an aperture 22 into which is mounted a fitting 23. While the fitting may be secured by any suitable means in opening 22 of housing 11, in the illustrated form of the invention it is shown at 24 as being brazed, welded or similarly secured in position. The fitting 23, which carries the direct supply D and the control means C, extends through the aperture 22 to be wholly disposed in the inhalation chamber, and includes a pair of bores 26 and 27 connected to the direct supply D and control means C, said bores opening into a chamber 28, one side of which is adapted to overlie a valve port (not shown) in the neck 29 projecting from a cylinder or similar container (also not shown) providing a supply of breathable gas under pressure. Disposed in the bores 26 and 27 is a pair of Dill, Bridgeport Brass or Schrader-type valves 30 and 31 having operators 32, 32a, respectively.

The regulator 10 is connected to the neck 29 by means of a U-shaped yoke 33 having its ends 33a brazed, welded or similarly secured to the portion 23a of fitting 23 extending outwardly of cup-shaped member 12 and is clamped to the neck by a clamping screw 34 located in the bow of the U and pressing the neck into fluid tight engagement with the end of the fitting.

The control means C includes an expansible chamber means 25. The expansible chamber means, which may be in the form of a bellows or similar expansible and contractable means, is here shown as a piston 35 disposed in a cylinder 36. While it will be understood that the expansible chamber means may form a separate unit from the fitting 23 and be connected thereto through either the piston or the cylinder, in the herein illustrated form of the invention the cylinder 36 is an integral part of the fitting. The piston 35 is mounted in the cylinder and has an O-ring 37 positioned in a groove 38 formed circumferentially around the sides of the piston and engaging the walls of the cylinder to form a seal therewith. With this construction an expansible chamber 25a is formed in the cylinder between the inner end thereof and the end of the piston and is adapted to receive breathable gas from the source and maintain it at predetermined reduced pressure. The piston 35 has a bore 39 extending therethrough to connect the expansible chamber 25a to the inhalation chamber and a valve 40 having an operator 41 is mounted in the bore 39 with the operator projecting beyond the outer end of the piston to control the flow of gas therethrough into the inhalation chamber.

In accordance with the present invention, the piston 35 is urged from its normal position, in which there is full pressure in the expansible chamber 25a, to contracted position, when the valve 40 is opened and the pressure is reduced by the passage of air from the expansible chamber to the inhalation chamber, by spring means 42 surrounding a reduced portion 43 of the piston and having its outer end engaging washer means 44 carried by the cylinder so as to urge the piston toward the closed end of the cylinder as the pressure in the expansible chamber drops below a predetermined value.

As shown in FIG. 1, the operator 32 for the valve 30, which controls the flow of breathable gas from the source under pressure through the bore 26 which, as illustrated, includes a flow restricting and pressure reducing constriction 45, extends beyond the inner end wall of the cylinder into the expansible chamber 25a under the end of the piston, so that when the valve 40 is opened the spring 42 moves the piston toward the inner wall of the cylinder so that it will engage the operator 32 for the valve 30 to cause the valve to admit air from the source and restore the predetermined pressure in the expansible chamber and move the piston to its normal position upon closing of valve 40. The constriction 45 restricts the flow of air in such a manner that the piston is permitted to bottom for each operation of the valve 40 so that it can effect the desired control of the direct supply D as will be explained. During the normal operation of the regulator apparatus, means, such as button or plate 52 is carried by plates 53, 54 secured to the flexible diaphragm 18 for engaging the operator 41 of the valve 40, as the diaphragm flexes, to open the same in response to the pressure differential created when the air is inhaled from the inhalation chamber 17. A plunger member 55 threadingly connected to the plate 52 and which serves a purpose to be hereinafter described, is slidably carried in a bushing 56 and extends outwardly of housing 11.

It will be seen that flexing of diaphragm 18, as the result of reduced pressure in the inhalation chamber, causes the operating plate 52 to engage and depress the operator 41 of valve 40, thereby opening the valve and communicating the expansible chamber 25a with the inhalation chamber.

If the reduced pressure in the expansible chamber is 30 p.s.i. it will be seen that the breathing effort required to cause the diaphragm to operate valve 40 will be very small as compared to the effort needed to operate the valve in the supply means D, directly connected to the supply at high pressures of about 2500 p.s.i. As soon as the valve 40 opens the spring moves the piston down and, as will be explained, provides the power for opening the valve in the supply means D.

The bore 27, which as aforenoted opens into the chamber 28, directly communicates the chamber 28 and the source of breathable gas under pressure with the inhalation chamber 17 through the valve 31 of the direct supply D. As illustrated, the operator 32 for the valve 31 extends outwardly of the bore 27 and parallels the path of travel of piston 35, which carries at its outer end a valve actuator 46 adapted to engage the operator 32a as the piston moves to contracted position within cylinder 36. While the actuator 46 may be connected to the piston in any manner known to the art, in the herein illustrated form of the invention the actuator is slidably mounted on a reduced threaded neck portion 47 of the piston and abuts a shoulder 48 thereof. A nut 49 threadingly engages the outer end of the neck 47 to press the actuator into engagement with the shoulder 48 of the piston to lock the actuator in position. In order to properly position the actuator 46 for operable engagement with the operator 32a of valve 31 as the piston moves to contracted position, a pin 50 is provided secured to the cylinder for slidably engaging an opening 51 in the actuator. It will be seen that, by means of this construction, as the valve 40 is opened, the spring moves the piston to contracted position and the actuator 46 will engage the operator 32a for valve 31 to open the same thereby directly communicating the inhalation chamber 17 with the source of breathable gas under pressure for rapidly supplying air to and restoring the pressure in the inhalation chamber and returning the diaphragm to its normal position. This closes valve 40 and permits the piston in the expansible chamber to return to normal position in response to air fed thereto through valve 30 and to close valve 31. Thus, the inhalation chamber and source are directly connected in response to contraction of the expansible chamber means for rapidly restoring the air and pressure in the inhalation chamber and the pressure required to operate the regulator is small and uniform even though the pressure in the source may vary, thereby facilitating smooth operation and a minimum of exertion.

The plunger member 55, which as aforenoted is connected to the operating plate 52 for valve 40 and extends outwardly of the housing 11, is adapted to be manually depressed to operate the regulator, in the absence of a reduction of pressure in the inhalation chamber 17, for flushing the inhalation chamber as is well understood in the art.

Referring now to FIGS. 3 to 6, another form of the invention is shown, embodied in a breathable gas regulator apparatus of the type disclosed in FIGS. 1 and 2, in which there are means for automatically indicating that the gas pressure at the source has dropped below a predetermined level and means for providing a reserve supply of breathable gas after the pressure at the source has dropped below the predetermined level. In this form of the invention, the means for directly communicating the inhalation chamber 17 with the source of breathable gas includes, not only the valve section comprising bore 27 and valve 31, as described in connection with FIGS. 1 and 2, but a second valve section similar thereto. The second valve section, which is adapted to communicate the inhalation chamber with the source under normal pressure conditions at the source, includes a bore 57 formed in fitting 23 having one end opening into chamber 28 and the other end into the inhalation chamber. A valve 58 is disposed in bore 57 with its operator 59 extending outwardly thereof into inhalation chamber 17. A second valve 60 is disposed in bore 57 in inverted position at the opposite end thereof.

According to the invention, the valve 60, which may be called a reducing or automatic shut-off valve, is normally held closed and is moved to open position when gas is flowing, against the cooperative force of valve spring 61 and coil spring 62, the latter being positioned in the bore 57 between a shoulder 63 formed in the bore and the valve cup 64 of valve 60, by the pressure of the gas at the source acting on the valve cup through the bore in the body 65 of the valve. The sum of the forces of the cooperating springs 61 and 62 establishes the pressure required to maintain valve 60 in open position, thus determining the pressure level below which the second valve section will not function to communicate the inhalation chamber with the source. The automatic shut-off feature of the second valve section, as will be readily understood, serves as a warning that the breathable gas pressure at the source is dangerously low.

The valve 58 of the second valve section is operated by the engagement of the actuator 46 with the operator 59 of the valve as the expansible chamber 25 contracts, similar to the function of the regulator of FIGS. 1 and 2. In the instant regulator apparatus, however, the actuator 46 is rotatably carried by the piston 35 so that it may be shifted from its operable position adjacent valve 58 of the second valve section to a position operably adjacent valve 31 of the first, and in this embodiment of the invention, reserve valve section.

As shown, the actuator 46 is provided with a projecting portion 66 having a pin or similar member 67 connected thereto for engagement in a slot 68 formed in a headed operating member 69 journaled in a bushing 70 in the wall 12 of housing 11. The operating member, which is of the push-pull type and extends outwardly of the housing 11 to be manually controlled for moving the actuator 46 between positions operably adjacent valves 58 and 31, has O-rings 71 positioned in grooves 72, formed circumferentially therearound, for engaging the wall of the bushing 70 to form a seal therewith. A detent 73 carried by the bushing is adapted to engage in notches 74 or 75 in the operating member 69 for retaining the actuator 46 in positions operably adjacent valves 58 and 31 respectively.

In the operation of the regulator of FIGS. 3-6, the actuator 46 is normally positioned to engage the operator 59 of the valve 58 and the automatic shut-off valve 60 is biased into open position by the gas pressure at the source. The regulator functions in the same manner as was described with respect to FIGS. 1 and 2, however, when the gas pressure at the source drops below the predetermined level the valve 60 automatically closes to warn that the gas pressure is dangerously low. Thereafter, the operating member 69 is pulled axially in a direction away from the housing to disengage the detent 73 from the notch 74 and shift the actuator 46 into position operably adjacent the operator 32 of valve 31, providing a reserve and thus enabling the remaining breathable gas at the source to be used. The detent 73 engages in notch 75 to retain the actuator in reserve position.

The regulator of FIGS. 3-6 is provided with means for flushing the inhalation chamber, in the absence of a reduction of pressure therein, in either the normal or reserve positions of actuator 46. This flushing means, which may be an addition or an alternative to the flushing means described in connection with FIGS. 1 and 2, comprises cam means 76 formed integral with actuator 46 adjacent and to the rear of the operating tip 46a of the actuator. The cam means are adapted to be moved into camming engagement with the operators 59 and 32 of the valves 58 and 31, respectively, by pulling the operating member 69 to disengage the detent 73 and move the actuator to flushing position. A pin 77 is provided, extending through the operating member, for abutting the bushing 70 to prevent the actuator from being pulled past reserve flushing position.

Thus, it will be seen that a breathable gas regulator apparatus has been provided which operates at reduced pressure and includes self-contained gas pressure warning means and reserve facilities.

In FIGS. 7 through 9 the invention is shown applied to a breathable gas regulator apparatus 78 having a substantially tubular housing 79 closed at opposite ends by bells 80 and 81 having hose connectors 82 and is divided into an inhalation chamber 83 and an exhalation chamber 83a by a flexible diaphragm 84 secured to the housing by a ring 84a. The flexible diaphragm 84, which may be formed of neoprene or the like elastomeric material, is provided with a slack portion indicated at 85 to facilitate the operable flexing of the diaphragm and for other purposes to be hereinafter explained.

A fitting, generally indicated by the numeral 86, is disposed in an opening 87 formed in the wall of the housing and extends into the inhalation chamber 83. The fitting, which is sealingly secured in the opening of the housing has connected at its outer end a yoke 88 by means of a nut 89 threadingly engaging the fitting, which serves to connect the fitting to a neck 90 projecting from a cylinder or similar container (not shown) for a supply of breathable gas under pressure.

The fitting 86 includes an expansible chamber means 91, wholly disposed in the inhalation chamber 83, and a pair of spaced parallel bores 92 and 93 opening into a chamber 94 which is adapted to overlie a valve port (not shown) in the neck 90.

The expansible chamber means 91, which may be a bellows or the like expansible and contractable device, in the illustrated form of the invention is shown as a piston 95 disposed in a cylinder 96. While the expansible chamber means may form a separate unit from the fitting 86 and be connected thereto by either the piston or the cylinder, in the preferred form of the invention the cylinder 96 forms an integral part of the fitting. The piston has an O-ring 97 positioned in a groove 98, formed circumferentially therearound, engaging the walls of the cylinder to form a seal therewith. As was described with respect to the regulators of FIGS. 1 through 6, an expansible chamber 91a is formed in the cylinder between the inner end thereof and the end of the piston for receiving breathable gas from the source and maintaining it at a predetermined reduced pressure.

The piston 95 has a bore 99 extending therethrough to connect the expansible chamber 91a to the inhalation chamber and a valve 100 is disposed in the bore with the operator 101 projecting beyond the outer end of the piston to control the flow of breathable gas from the expansible chamber to the inhalation chamber.

A spring 102 surrounding a reduced portion 103 of the piston and having its outer end engaging washer means 104 urges the piston toward the closed end of the cylinder as the pressure in the expansible chamber drops below a predetermined value. Thus, the piston is urged from its normal position, in which there is full pressure in the expansible chamber 91a, to contracted position, when the pressure is reduced by the passage of gas from the expansible chamber to the inhalation chamber through the bore 99 and valve 100.

The bore 93, which is formed with a flow and pressure reducing constriction 105 adjacent the chamber 94, opens into the expansible chamber 91a and has disposed therein a valve 106, the operator 107 of which is positioned in the expansible chamber in the path of the piston 95. The valve 106, which controls the flow of breathable gas from the source under pressure through the bore 93 into the expansible chamber 91a is operated by the piston 95 when the pressure in the expansible chamber falls below a predetermined value. It will be seen that when the pressure falls below the predetermined value the spring 102 moves the piston toward the inner wall of the cylinder 96 so that it engages the operator 107 of the valve to cause the valve to admit air from the source and restore the predetermined pressure in the expansible chamber and return the piston to its normal position.

The bore 92 communicates the chamber 94 directly to the inhalation chamber 83 and is provided with a valve 108 having its operator 109 disposed in the inhalation chamber parallel to the piston 95 and in the path of movement of an actuator 110 rigidly mounted at the outer end of the piston. The actuator, is mounted on a reduced threaded neck portion 111 of the piston and is retained thereon by a nut 112.

The cylinder 96 fixedly carries a bracket 113 which pivotally mounts a lever 114, extending across the outer end of the piston for operably engaging the operator 101 of valve 100.

The diaphragm 84, which is centrally supported by plates 115 and 116, is provided with a stud 117 extending therethrough. While the stud may take any form known to the art, in the illustrated form of the invention it is shown as comprising a pair of stud members 118 and 119, each of which includes a substantially disk-like base 120 and a forked stud portion 121. The disk-like bases 120 are connected to the diaphragm and retain the plates 115 and 116 in position by means of screws 120a connecting the bases.

A link 122 is pivotally connected to the free end of lever 114 and has its free end pivotally connected to the forked stud portion 121 of stud member 118. A second link 123 is pivotally connected to the end of forked stud portion 121 of stud member 118 and has its free end pivotally connected to a bracket 123a on the fitting 86.

In the operation of the regulator 78 as heretofore described, the inhalation chamber 83 and the expansible chamber 91a are filled with breathable gas and the valves 100, 106 and 108 are closed. When the breathable gas is inhaled from the inhalation chamber a pressure differential is created at opposite sides of the diaphragm 84 so that the diaphragm flexes into the inhalation chamber. It will be seen that as the diaphragm flexes, carrying stud 117 with it, the link 122 is shifted to pivot the lever 114 around bracket 113 into engagement with the operator 101 of valve 100 to open the same and permit the breathable gas in the expansible chamber 91a to flow into the inhalation chamber. As the pressure is reduced in the expansible chamber by the gas flowing into the inhalation chamber the piston is moved to contracted position by the spring 102 and engages the operator 107 of valve 106 to open the valve and permit breathable gas to enter the expansible chamber from the source. The pressure of the breathable gas entering the expansible chamber from the source is reduced by the pressure reducing constriction 105 in bore 93. The constriction 105 restricts the flow of air in such a manner that it permits the piston to move toward the inner end of the cylinder for each operation of the valve 100 so that it can effect the desired control of direct supply valve 108. Immediately after the operator 107 has been engaged by piston 95, the actuator 110, which is also carried by the piston, engages the operator 109 of the valve 108 to open the valve and permit breathable gas to enter the inhalation chamber directly from the source. It will be understood that the timing between the operation of valves 106 and 108 can be controlled by carefully selecting the length of the operators. The rapid filling of the inhalation chamber 83 through the bore 92 and valve 108 quickly restores the diaphragm 84 to its normal balanced position thereby pivoting lever 114 out of engagement with the operator of valve 100 to break communication between the expansible chamber 91a and the inhalation chamber. As soon as the valve 100 is closed the gas entering the expansible chamber through valve 106 moves the piston out of contracted position thus releasing the operator 109 to close the valve 108 and operator 107 to close valve 106. At this time the regulator is in condition to commence a new cycle of operation.

The regulator 78, similar to the regulators of FIGS. 3 through 6, is designed to automatically cease operating when the gas pressure at the source has dropped below a predetermined level to indicate to the user that he has only a small supply of breathable gas remaining. According to this form of the invention the regulator ceases functioning when the gas pressure at the source is insufficient to return the piston 95 to normal position against the spring 102. It will be seen that by carefully selecting the spring 102 the predetermined low level of gas pressure at the source can be established.

The regulator 78 includes means for providing a reserve supply of breathable gas after the regulator has stopped functioning as a result of the pressure at the source dropping below the predetermined level. As shown, an operating member 124 is slidably mounted in the housing 79 to pass through the exhalation chamber 83a parallel to the diaphragm 84. Links 125 are pivotally connected at one end to the operating member and extend parallel thereto. The free ends of the links 125 are pivotally connected to the end of forked stud portion 121 of stud member 119.

In the operation of the reserve means, when the piston 95 has not been fully returned to normal position, indicating a dangerously low pressure at the source, the operating member 124 is pulled axially outwardly of housing 79. The axial movement of the operating member is transmitted through links 125 to stud 117, and the diaphragm 84 is shifted transversely, in the direction of movement of the operating member, to shift the links 122 and 123 and the lever 114 into reserve operating position. In reserve position, the lever is adapted to engage the operator 101 of valve 100 as the diaphragm flexes even though the piston 95 has not been returned to its normal position. The shifting of the diaphragm is facilitated by the slack 85 therein, which has been heretofore described.

The housing 79 mounts a detent 126 adapted to be engaged in notches 127 and 128 in the operating member 124 for retaining the operating member in normal or reserve positions.

The regulator 78 is adapted to have the inhalation chamber 83 thereof flushed, in the absence of a reduction in pressure therein, by pulling the operating member in an axial direction outwardly of the housing so that the diaphragm 84 is shifted to move the lever 114 into engagement with the operator 101 of valve 100, thereby causing the expansible chamber 91a to exhaust into the inhalation chamber with a consequent flushing of the later. A coil spring 129 surrounds the operating member 124 between the housing 79 and the pin 130 for returning the operating member to normal position as the inhalation chamber is flushed. The operating member is prevented from being drawn inwardly of the housing under the pressure of spring 129 by a pin 131 extending transversely through the operating member and adapted to engage the outer surface of the housing.

Thus, among others the several objects and advantages of the invention as aforenoted are achieved. Obviously numerous changes in the structure may be resorted to without departing from the spirit of the invention as defined by the claims.

I claim:
1. A breathable gas regulator apparatus comprising a housing; a pressure-responsive diaphragm dividing the housing into an inhalation chamber and an exhalation chamber, said exhalation chamber being exposed to the pressure of the surrounding fluid medium; a source of breathable gas under pressure; first means including means in said inhalation chamber operable to directly communicate said source of breathable gas to said inhalation chamber; and separate pneumatic amplifier means including second means disposed in said inhalation chamber and operated by said pressure-responsive diaphragm in response to reduced pressure in said inhalation chamber for operating said first means for communicating said source to said inhalation chamber, said amplifier means being operable with substantially reduced effort relative to said first means.

2. A breathable gas regulator apparatus as in claim 1 in which said amplifier means operated by said pressure-responsive diaphragm comprises an expansible chamber normally urged to contracted position, valve means adapted to be operated by said pressure-responsive diaphragm for communicating said expansible chamber with said inhalation chamber, and second valve means including pressure reducing means operated in response to movement of said expansible chamber to contracted position for communicating said expansible chamber to said source of breathable gas, said first means for directly communicating said inhalation chamber being operated in response to movement of the expansible chamber to contracted position after said second valve means is operated.

3. A breathable gas regulator apparatus as in claim 1, in which said means operable to directly communicate said source of breathable gas to said inhalation chamber comprises valve means opening into said inhalation chamber and having communication with said source, and means for automatically breaking communication between said valve means and said source when the gas pressure of said source drops below a predetermined value.

4. A breathable gas regulator apparatus as in claim 3, and reserve means operable by said means operated by said pressure-responsive diaphragm for directly communicating said source of breathable gas to said inhalation chamber after the gas pressure of said source has dropped below said predetermined value.

5. A breathable gas regulator apparatus as in claim 4, in which said second means includes an actuating member for selectively engaging said first means and said reserve means and operating the same; and in which there is an operating member adjustably shiftably carried by said housing and extending outwardly thereof for selectively shifting said actuating member into engagement with said first means and said reserve means.

6. A breathable gas regulator apparatus as in claim 5, in which said actuating member includes cam means for operating said first means or said reserve means in the absence of a reduction of pressure in said inhalation chamber, said operating member being adapted to selectively move said cam means into operable engagement with said first means or said reserve means for flushing said inhalation chamber.

7. A breathable gas regulator apparatus as in claim 1, and lever means pivotally mounted at one end relative to said housing for operably engaging said second means; a stud rigidly carried by said pressure-responsive diaphragm and extending normal thereto; linkage means connecting the free end of said lever means to said stud for pivoting said lever relative to said housing for operating said second means when said diaphragm is flexed in response to a reduction of pressure in said inhalation chamber, said linkage means including a first link member having one end pivotally connected to the free end of said lever means and the other end connected to the stud and a second link member having one end pivotally connected to said stud and the other end pivotally mounted relative to said housing, said first and second link members being of substantially the same length; and means for shifting said diaphragm and linkage means to adjust the position of said lever means relative to said second means, said shifting means including an operating member adjustably shiftably carried by said housing substantially parallel to said diaphragm, shifting linkage means connecting said operating member to said stud perpendicular thereto so that said stud is solely axially movable relative to said operating member, said shifting linkage means including a shifting link member extending parallel to said operating member and having one end pivotally connected to said operating member and the other end pivotally connected to said stud, said shifting link member being substantially the same length as said first and second link members so that on shifting the position of said operating member relative to said housing said diaphragm and linkage means are shifted an equal amount.

8. A breathable gas regulator apparatus as in claim 7, in which there are detent means for retaining said operating member in adjusted positions relative to said housing.

9. A breathable gas regulator apparatus as in claim 7, in which said stud passes through said diaphragm, and said linkage means, lever means and second means are disposed in said inhalation chamber and said means for shifting said diaphragm and linkage means is disposed in said exhalation chamber.

10. A breathable gas regulator apparatus comprising a housing; a pressure-responsive diaphragm dividing the housing into an inhalation chamber and an exhalation chamber, said exhalation chamber being exposed to the pressure of a surrounding fluid medium; a source of breathable gas under pressure; first means having communication with said source of breathable gas and having a valve in said inhalation chamber operable to directly communicate said source to said inhalation chamber; and second means including a separate valve operated by said pressure-responsive diaphragm in response to reduced pressure in said inhalation chamber for operating said first means for communicating said source to said inhalation chamber, said second means having constricted pressure reducing communication with said source of breathable gas and being operable with substantially reduced effort relative to said first means.

11. A breathable gas regulator apparatus comprising a housing; a pressure-responsive diaphragm dividing the housing into an inhalation chamber and an exhalation chamber, said exhalation chamber being exposed to the pressure of a surrounding fluid medium; a source of breathable gas under pressure; first means having a valve in the inhalation chamber operable to directly communicate said source of breathable gas to said inhalation chamber; separate means operated by said pressure-responsive diaphragm in response to reduced pressure in said inhalation chamber for operating said first means for communicating said source to said inhalation chamber, said separate means being operated with substantially reduced effort relative to said first means; and means for automatically interfering with the communication of said source of breathable gas to said inhalation chamber when the gas pressure of said source drops below a predetermined value.

12. A breathable gas regulator apparatus comprising a housing; a pressure-responsive diaphragm dividing the housing into an inhalation chamber and an exhalation chamber, said exhalation chamber being exposed to the pressure of a surrounding fluid medium; a pressure-responsive, expansible chamber connected to the housing and normally urged to contracted position; a source of breathable gas under pressure; means securing said housing to said source of breathable gas; means having a valve provided with operating means connecting the source of breathable gas to the expansible chamber, said means including pressure reducing means; second valve means connecting the expansible chamber to the inhalation chamber; third valve means having operating means directly connecting the source of breathable gas to the inhalation chamber; means controlled by said diaphragm for opening said second valve means in response to reduced pressure in said inhalation chamber to cause gas to pass from the expansible chamber into the inhalation chamber and cause the expansible chamber to contract; first actuating means controlled by the expansible chamber and directly engaging said operating means for said first valve to open said valve in response to decrease in pressure in the expansible chamber and movement thereof to contracted position, thereby to cause gas from said source to restore the pressure in the expansible chamber and move the same to expanded position to withdraw the said first actuating means from valve operating position; and second actuating means controlled by the expansible chamber and directly engaging said operating means for said third valve means to open said third valve means after said first valve is open for enabling gas from said source to directly enter said inhalation chamber and move said diaphragm to close said second valve means, said second actuating means being withdrawn from valve operating position as the pressure is restored in the expansible chamber to move the same to expanded position.

13. A breathable gas regulator apparatus as in claim 12, and means for automatically interfering with the flow of gas from said source into said inhalation chamber when the gas pressure of said source drops below a predetermined value.

14. A breathable gas regulator apparatus as in claim 12, in which there are means for automatically interfering with the operation of said third valve means when the gas pressure of said source drops below a predetermined value.

15. A breathable gas regulator apparatus as in claim 12, wherein said third valve means includes a valve, and conduit means for communicating said valve with said source of breathable gas; and in which there are means for automatically closing said conduit means when the gas pressure of said source drops below a predetermined value.

16. A breathable gas regulator apparatus as in claim 15, and reserve valve means having operating means for directly connecting said source of breathable gas to said inhalation chamber, said reserve valve means and second actuating means being manually relatively movable so that said reserve valve operating means is engaged by said second actuating means for connecting said source of breathable gas to said inhalation chamber when said gas pressure has dropped below said predetermined value.

17. A breathable gas regulator apparatus as in claim 12, wherein said means controlled by said diaphragm comprises lever means pivotally mounted at one end relative to said housing for operably engaging said second valve means; a stud rigidly carried by said pressure-responsive diaphragm and extending normal thereto; and linkage means connecting the free end of said lever means to said stud for pivoting said lever relative to said housing for operating said second valve means when said diaphragm is flexed in response to a reduction of pressure in said inhalation chamber, said linkage means including a first link member having one end pivotally connected to the free end of said lever means and the other end connected to the stud and a second link member having one end pivotally connected to said stud and the other end pivotally mounted relative to said housing.

18. A breathable gas regulator apparatus as in claim 17, wherein said first link member and said second link member are of substantially the same length; and in which there are means for shifting said diaphragm and said linkage means to adjust the position of said lever means relative to said second valve means, said shifting means including an operating member adjustably shiftably carried by said housing substantially parallel to said diaphragm, and shifting linkage means connecting said operating member to said stud perpendicular thereto so that said stud is solely axially movable relative to said operating member, said shifting linkage means including a shifting link member extending parallel to said operating member and having one end pivotally connected to said operating member and the other end pivotally connected to said stud, said shifting link member being substantially the same length as said first and second link members so that on shifting the position of said operating member relative to said housing said diaphragm and linkage means are shifted an equal amount.

19. A breathable gas regulator apparatus as in claim 12, wherein said third valve means includes a first valve section and a reserve valve section and in which said second actuating means is selectively movable between positions for operably engaging said first valve section and said reserve valve section; said first valve section including a first section valve having operating means adapted to be engaged by said second actuating means, conduit means communicating said first section valve with said source of breathable gas and a shut-off valve in said conduit adapted to be open when the gas pressure at said source is above a predetermined value and to automatically close when the gas pressure drops below said predetermined value; said reserve valve section including a reserve valve having operating means adapted to be engaged by said second actuating means and second conduit means directly communicating said reserve valve means with said source.

20. A breathable gas regulator apparatus as in claim 19, and means for selectively moving said second actuating means between positions for operably engaging the operating means for said first section valve and said reserve valve, said moving means including an operating member connected to said second actuating means and carried by said housing to extend outwardly therefrom and detent means cooperating with said operating member for positively selectively locating and retaining said second actuating means in positions relative to said first section valve and said reserve valve.

21. A breathable gas regulator apparatus as in claim 20, and cam means forming part of said second actuating means for operably engaging the operating means of said first section valve or said reserve valve, said cam means being selectively movable into operable engagement with the operating means of said first section valve and said reserve valve by said operating member for flushing said inhalation chamber in the absence of a reduction of pressure in said inhalation chamber.

References Cited in the file of this patent

UNITED STATES PATENTS

| | | |
|---|---|---|
| 2,828,739 | Kimes | Apr. 1, 1958 |
| 2,939,456 | Fay | June 7, 1960 |
| 2,939,471 | Fay | June 7, 1960 |